(12) United States Patent
Schuster et al.

(10) Patent No.: US 8,087,426 B2
(45) Date of Patent: Jan. 3, 2012

(54) TOILET FILL VALVE LOCK AND METHOD

(75) Inventors: Michael J. Schuster, Joliet, IL (US); Larry Schneider, Wadsworth, IL (US)

(73) Assignee: MJSI, Inc., Shorewood, IL (US)

( * ) Notice: Subject to any disclaimer, the term of this patent is extended or adjusted under 35 U.S.C. 154(b) by 0 days.

(21) Appl. No.: 12/425,722

(22) Filed: Apr. 17, 2009

(65) Prior Publication Data

US 2009/0199911 A1 Aug. 13, 2009

Related U.S. Application Data (63) Continuation of application No. 11/355,271, filed on Feb. 15, 2006, now Pat. No. 7,533,688.

(60) Provisional application No. 60/653,449, filed on Feb. 16, 2005.

(51) Int. Cl.
*F16K 31/18* (2006.01)
*F16K 7/10* (2006.01)
*E03D 3/12* (2006.01)
*F16L 37/244* (2006.01)

(52) U.S. Cl. .......... 137/426; 403/109.8; 4/324; 285/308

(58) Field of Classification Search ............ 137/426, 137/444, 15.26; 285/305, 308, 312; 4/324; 403/109.1, 109.2, 109.3, 329, 330
See application file for complete search history.

(56) References Cited

U.S. PATENT DOCUMENTS

| | | |
|---|---|---|
| 136,128 A | 2/1873 | Bralley |
| 994,746 A | 6/1911 | Dwyer et al. |
| 996,743 A | 7/1911 | Yancey |
| 1,113,057 A | 1/1914 | Schumann |
| 1,787,601 A | 1/1931 | Swanberg |
| 2,087,503 A | 7/1937 | Clemmons |
| 2,465,866 A | 3/1949 | Gaines |
| 2,512,176 A | 6/1950 | Shaffer |
| 2,736,037 A | 2/1956 | Hardie |
| 2,791,235 A | 5/1957 | Smith |
| 2,799,865 A | 7/1957 | Schuster |
| 3,040,769 A | 6/1962 | Lamb |
| 3,086,546 A | 4/1963 | Brown |
| 3,172,128 A | 3/1965 | Ducey |
| 3,321,972 A | 5/1967 | Goldtrap |
| 3,457,947 A | 7/1969 | Fitzgerald |
| 3,744,064 A | 7/1973 | Preston |
| 3,762,395 A | 10/1973 | Taylor |
| 3,986,216 A | 10/1976 | Davis et al. |
| 3,994,628 A | 11/1976 | Kemper |

(Continued)

OTHER PUBLICATIONS

International Search Report for PCT/US06/05295 dated Sep. 13, 2007.

*Primary Examiner* — Stephen M Hepperle
*Assistant Examiner* — Atif Chaudry
(74) *Attorney, Agent, or Firm* — Thomas, Kayden, Horstemeyer & Risley, LLP (57) ABSTRACT

Various embodiments of a toilet fill valve lock and method for adjusting the fill water level in a toilet are provided. In one embodiment a toilet fill valve includes a riser that extends along an axis and an inner shaft that is disposed along the axis between the axis and the riser. The toilet fill valve further includes a lock that is moveable toward and away from the axis and which can limit the movement of the riser relative to the inner shaft about the axis when in a locked position.

7 Claims, 5 Drawing Sheets

U.S. PATENT DOCUMENTS

| | | | | |
|---|---|---|---|---|
| 4,007,498 | A | 2/1977 | Pearson | |
| 4,017,916 | A | 4/1977 | Pearson | |
| 4,032,822 | A | 6/1977 | Un | |
| 4,090,532 | A | 5/1978 | Story, Jr. | |
| 4,134,164 | A | 1/1979 | Sanmartin Rial | |
| 4,145,775 | A | 3/1979 | Butler | |
| 4,182,364 | A * | 1/1980 | Gilbert et al. | 137/426 |
| 4,351,071 | A | 9/1982 | Clar | |
| 4,392,260 | A | 7/1983 | Bensen | |
| 4,420,845 | A | 12/1983 | Antunez | |
| 4,505,231 | A | 3/1985 | Syler | |
| 4,527,295 | A | 7/1985 | Lacore | |
| 4,700,413 | A | 10/1987 | Lopez | |
| 4,707,867 | A | 11/1987 | Kawabe et al. | |
| 4,764,996 | A | 8/1988 | Pino | |
| 4,765,363 | A | 8/1988 | Pi-Yu | |
| 4,770,388 | A | 9/1988 | Carman | |
| 4,793,588 | A | 12/1988 | Laverty, Jr. | |
| 4,898,124 | A | 2/1990 | Granberg et al. | |
| 4,918,764 | A | 4/1990 | Haselswerdt et al. | |
| 4,980,932 | A | 1/1991 | Stemples | |
| 5,007,452 | A | 4/1991 | Antunez | |
| 5,036,553 | A | 8/1991 | Sanderson | |
| 5,052,060 | A | 10/1991 | Makita et al. | |
| 5,083,323 | A | 1/1992 | Cannan | |
| 5,134,729 | A | 8/1992 | Shaw | |
| 5,211,204 | A * | 5/1993 | Mikol | 137/410 |
| 5,228,152 | A | 7/1993 | Fraley | |
| 5,232,011 | A | 8/1993 | Royalty | |
| 5,245,710 | A | 9/1993 | Haselswerdt et al. | |
| 5,255,703 | A * | 10/1993 | Johnson | 137/428 |
| 5,327,931 | A | 7/1994 | Royalty et al. | |
| 5,362,026 | A | 11/1994 | Kobayashi et al. | |
| 5,432,959 | A | 7/1995 | Ellsworth et al. | |
| 5,442,820 | A | 8/1995 | Becker | |
| 5,469,586 | A | 11/1995 | Tsutsui et al. | |
| 5,542,448 | A | 8/1996 | Campbell et al. | |
| 5,708,991 | A | 1/1998 | DeMarco | |
| 5,715,860 | A | 2/1998 | Horad | |
| 5,742,951 | A | 4/1998 | Wright et al. | |
| 5,775,366 | A | 7/1998 | Ray et al. | |
| 5,794,279 | A | 8/1998 | Schwartz | |
| 5,862,537 | A | 1/1999 | Osmond | |
| 5,975,125 | A | 11/1999 | Nichols-Roy | |
| 6,047,725 | A | 4/2000 | Gish et al. | |
| 6,155,288 | A | 12/2000 | Johnson | |
| 6,199,581 | B1 * | 3/2001 | Gil | 137/426 |
| 6,202,227 | B1 | 3/2001 | Gurowitz | |
| 6,209,576 | B1 | 4/2001 | Davis | |
| 6,219,856 | B1 | 4/2001 | Alles | |
| 6,263,519 | B1 | 7/2001 | Parsons et al. | |
| 6,295,660 | B1 | 10/2001 | Schuster | |
| 6,385,788 | B1 | 5/2002 | Wasielewski | |
| 6,450,195 | B1 | 9/2002 | Gil | |
| 6,560,790 | B2 | 5/2003 | Saar et al. | |
| 6,823,889 | B1 | 11/2004 | Schuster | |
| 6,837,264 | B1 | 1/2005 | Schuster | |
| 7,025,383 | B2 * | 4/2006 | Canale | 285/7 |
| 2002/0092090 | A1 | 7/2002 | Johnson | |
| 2002/0162166 | A1 | 11/2002 | Saar et al. | |
| 2004/0243161 | A1 * | 12/2004 | Kanodia et al. | 606/167 |

* cited by examiner

TOILET FILL VALVE LOCK AND METHOD

CROSS REFERENCE TO RELATED APPLICATIONS

This application is a continuation of, and claims priority to, co-pending U.S. patent application entitled "TOILET FILL VALVE LOCK AND METHOD" filed on Feb. 15, 2006 and assigned application Ser. No. 11/355,271, which in turn claims priority to U.S. Provisional Patent Application Ser. No. 60/653,449, filed Feb. 16, 2005, both of which are incorporated herein by reference in their entirety.

BACKGROUND OF THE INVENTION

Many different types of fill valves for controlling the level of liquid in a toilet tank are known. In general such toilet fill valves operate by sensing the liquid level in the tank using a float. The toilet fill valve is mounted at a height commensurate with the height of the tank such that the float position permits flow from an exterior water supply to the interior of the tank when the water level drops below a predetermined level. Thus, toilet fill valves of this type are used to maintain the water at a selected level and to refill the tank to the selected level following a flush cycle, as well as filling the toilet bowl to a selected level.

Toilet tanks are made in many different sizes and shapes and in many different heights. If a replacement toilet fill valve is needed, it is desirable to obtain a replacement that can be quickly and securely adjusted to different lengths according to the size tank for properly positioning the float. Conventional and/or pilot toilet fill valves often include a telescoping body that is adjustable to vary the height of the float to the predetermined liquid level in the tank. More specifically, the body of the toilet fill valve can include an inner shaft that communicates with the water inlet conduit, and a riser that communicates with an outlet to the tank. Unfortunately, when the telescoping inner shaft and riser are placed in the selected position or height, improper installation, or physical bumping during the repair or maintenance of the toilet, or water pressure and vibration can cause the riser to slip out of position. The water pressure then causes the toilet fill valve to rise, which causes the water to continue running and to overflow the toilet tank.

BRIEF DESCRIPTION OF THE DRAWINGS

Various embodiments of the present invention can be understood with reference to the following drawings. The components of the drawings are not necessarily to scale. Also in the drawings, like reference numerals designate corresponding parts throughout the several views.

DETAILED DESCRIPTION

Figure 1:
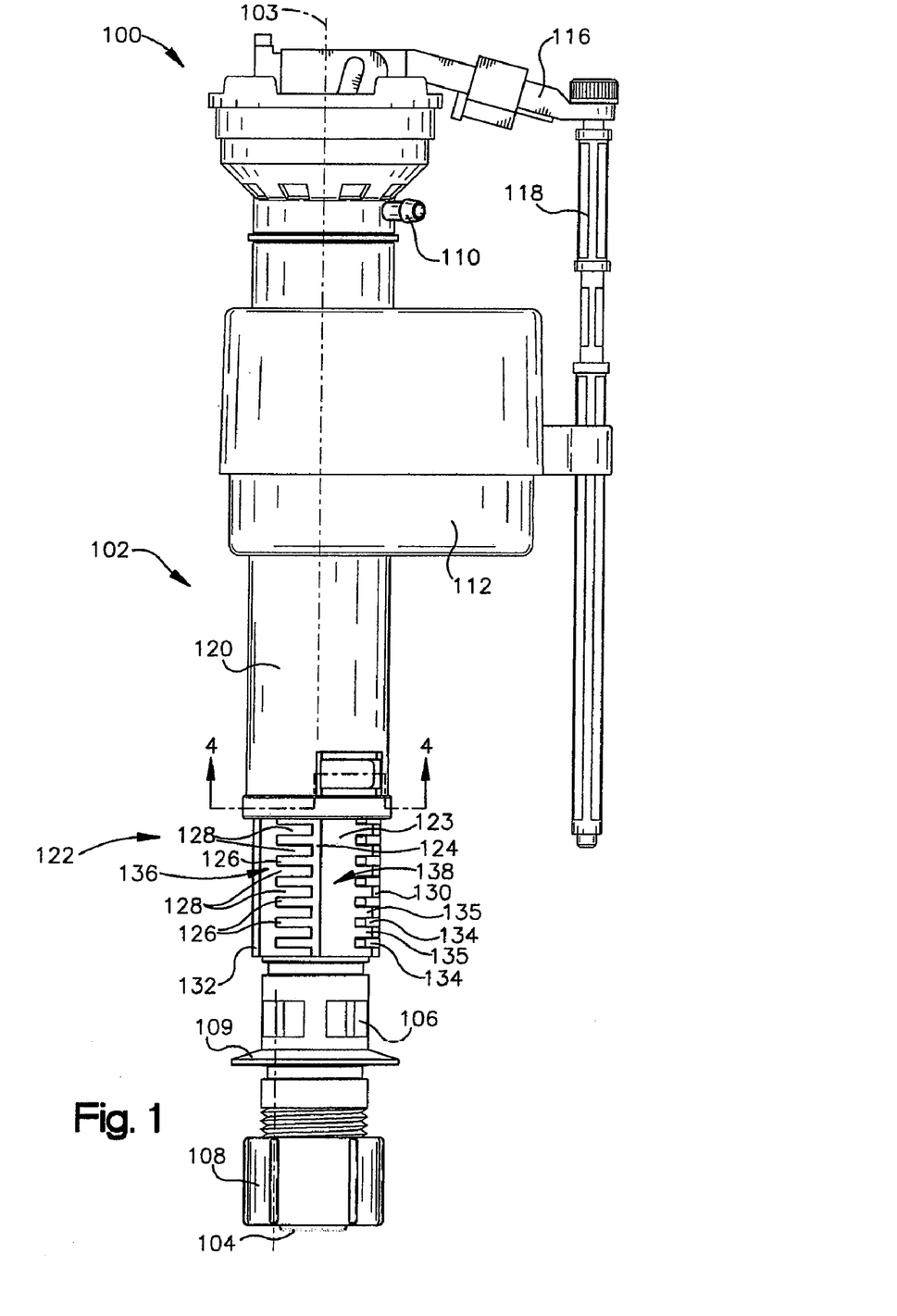
FIG. 1 is a drawing of a side view of a toilet fill valve according to an embodiment of the present invention.

With reference to FIG. 1, shown is a toilet fill valve 100 according to an embodiment of the present invention. The toilet fill valve 100 is typically installed within a toilet tank (not shown) of a toilet. The toilet fill valve 100 includes a valve body 102 that extends along an axis 103 from a water inlet 104 up to a top of the toilet fill valve 100. The toilet fill valve 100 also includes one or more water outlets 106 that allow water to flow into a toilet tank when the toilet fill valve 100 is installed. The toilet fill valve 100 may be any style of fill valve such as, for example, a ball cock valve, a pilot style valve, etc.

The water inlet 104 of the toilet fill valve 100 is configured to be coupled to a threaded connection 108 that can be coupled to a water source outside of a toilet tank that delivers pressurized water. The body 102 of toilet fill valve 100 when installed is supported by flange 109 and held in place by a retaining nut (not shown). The toilet fill valve 100 also includes a bowl fill valve 110, which is operatively coupled to the water inlet 104. When the toilet fill valve 100 is open and water flows from the water inlet 104 to the water outlets 106 and into a toilet tank, an amount of water is also supplied to the bowl fill valve 110.

The toilet fill valve 100 includes a float 112 that moves up and down the body 102 of the toilet fill valve 100. The toilet fill valve 100 also includes an actuating arm 116 that extends to a translating arm 118. The translating arm 118 operatively couples the float 112 to a free end of the actuating arm 116. When a toilet is flushed, water drains from the toilet tank by means of a flapper valve (not shown), for example, and the float 112 falls with the level of the water. Due to the fact that the float 112 is operatively coupled to the free end of the actuating arm 116 by way of the translating arm 118, the free end of the actuating arm falls with the float 112. The motion of the actuating arm 116 causes the toilet fill valve 100 to open thereby causing water to flow from the water inlet 104 out of the water outlet 106 to refill the toilet tank after the flapper valve closes. In addition, water flows out of the bowl fill outlet 110 and is typically routed to an overflow tube (not shown) within the toilet tank to the toilet bowl to refill the toilet bowl during a toilet flush cycle. Therefore, the actuating arm 116 is capable of moving from one position in which the toilet fill valve 100 is closed to prevent overfilling to another position in which the toilet fill valve 100 is opened in order to allow water to flow into the toilet tank.

The body 102 of the toilet fill valve 100 includes a telescopically adjustable riser 120 and inner shaft 122. Inner shaft 122 includes at least one stop 124 having a series of protrusions or ridges 126 extending therefrom and defining a plurality of grooves 128 between the protrusions or ridges 126. The row of discreet grooves 128 are shown as parallel to one another, although they may be curved or oriented at an angle relative to one another, and are spaced along the inner shaft 122 so that one end of the grooves 128 terminates at the stop 124 and the second end of the grooves terminates in open ends at a location remote from the stop. The protrusions 126 extend in a radially outward direction and also a distance, for example a circumferential distance, around a portion of body 123 of inner shaft 122. The inner shaft 122 can include at least one stop 124 but may also include additional stops, for example, stop 130 having a series of protrusions 134 that define a plurality of grooves 135 and stop 132 having a series of protrusions (not shown) that define a plurality of grooves (not shown).

The number of stops can vary, although additional stops and their respective series of protrusions can provide increased resistance against the water pressure to hold the riser 120 in place. Generally, each series of protrusions, for example the series of protrusions 126 extending from stop 124 and the series of protrusions 134 of stop 130, can extend a portion of the distance from one stop to the next stop, for example from stop 130 to the next adjacent stop 124. If there is only one stop, for example stop 124, then the series of protrusions 126 can extend a portion of the perimeter of the body 123 of the inner shaft 122, so as to define a channel, for example channels 136 and 138, to accept each flange of the riser 120, for example, flanges 204 and 206, as best seen in FIG. 2.

Figure 2:
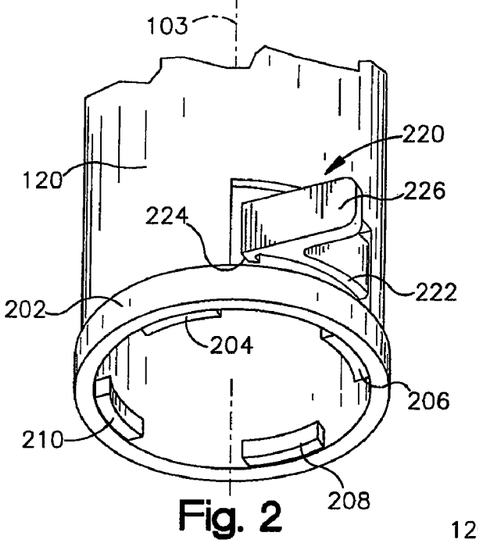
FIG. 2 is a perspective view showing the bottom portion of the riser of FIG. 1 showing flanges and a lock, according to an embodiment of the present invention.

FIG. 2 illustrates a perspective view of the bottom portion of the riser 120. The riser 120 includes a collar 202. The riser 120 slips over the inner shaft 122 upon assembly. In one embodiment, the collar 202 is merely a portion of and is integral to the riser 120, or the collar 202 may comprise a separate component attached to the riser 120, etc. The riser includes flanges 204, 206, 208, 210 which protrude radially inward from the collar 202. Each one of the flanges 204, 206, 208, 210 are designed to mate with one of the grooves, for example one of the plurality of grooves 128 (FIG. 1), defined by the series of protrusions, for example the series of protrusions 126 (FIG. 3), when the desired or predetermined height has been reached and set so as to substantially prevent vertical movement of the riser 120 along the axis 103 as will be further described. The vertical adjusting move involves rotating riser 120 and shaft 122 until flanges 204-210 disengage from their respective grooves and lie in the channels 136, 138 at which point riser 120 and shaft 122 can be telescoped vertically.

In another embodiment of the present invention the riser 120 includes a lock 220 having a body 222, a contact surface 224, and a release lever 226. When a supply of pressurized water is connected to the water inlet 102 (FIG. 1) as described above, there can be variation in pressure across the toilet fill valve 100 which can results in a force urging the toilet fill valve 100 in an upward direction. Relative movement between the riser 120 and the inner shaft 122 (FIG. 1), caused by improper installation, or force and vibration due to physical contact or water pressure, can cause the riser 120 to rotate relative to the inner shaft 122 about axis 103 which can cause the flanges 204, 206, 208, 210 to move out of the grooves of the inner shaft 122. The lock 220 which is movable toward and away from axis 103 can limit the radial movement of the riser 120 relative to the inner shaft 122 when in the locked position as will be described in further detail below. The lock 220 thereby prevents the flanges, for example flanges 204, 206 of the riser 120 from moving out of the grooves 128, 135, (FIG. 1) and into channels 136, 138, (FIG. 1) respectively, which would otherwise cause movement of the riser along the axis 103.

Figure 3:
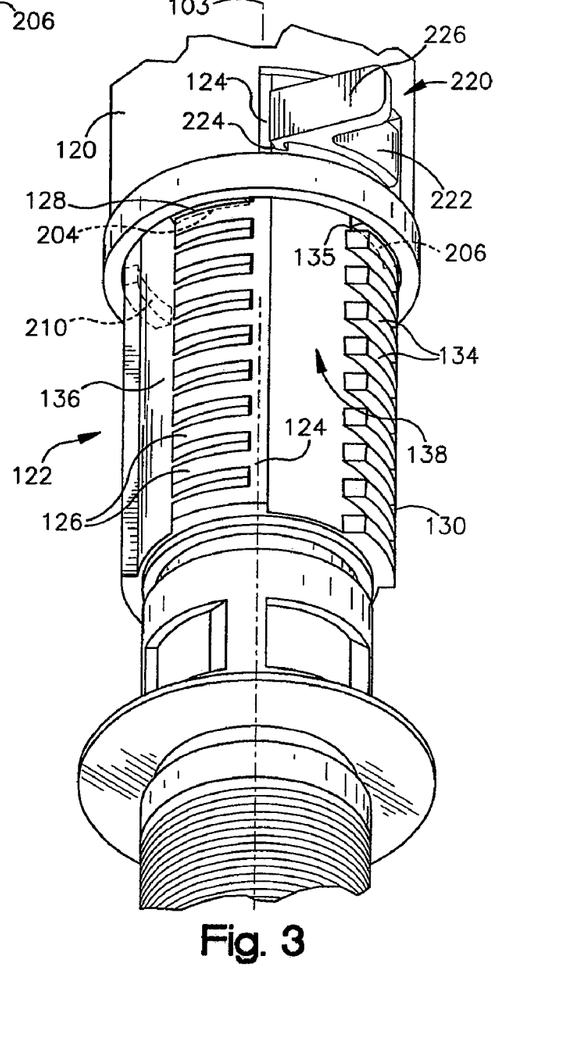
FIG. 3 is a perspective view of the toilet fill valve of FIG. 1 showing the lock in the locked position according to an embodiment of the present invention.

Referring now to FIG. 3, the adjustment of toilet fill valve 100 is described with respect to a setting of the riser 120 to a predetermined height. When the flanges 204, 206, (in phantom) align along the body 123 and within channels, for example channels 136, 138, of the inner shaft 122 adjacent to at least one stop, or between a pair of stops, for example between stops 124 and 130, and the protrusions 126, 134, respectively thereof, the riser 120 is free to move telescopically to adjust the height of the toilet fill valve 100. In this manner the riser 120 can be adjusted along the axis 103 in order to adjust the height of the float 112 (FIG. 1). That is, the height of riser 120 can be adjusted by aligning the flanges, for example flanges 204, 206, with the channels, for example channels 136, 138 of the inner shaft 122 and when the desired height is achieved, the riser 120 can be turned, in a first direction, for example counterclockwise, so that the flanges 204, 206, and 208, 210 (not shown) of the riser 120 each slide into a groove, for example, a groove 128 (FIG. 1) formed by the plurality of protrusions 126 (FIG. 1) of stop 124. That is, for example, flange 204 can reside between two of the plurality of protrusions 126 of stop 124, and flange 206 can reside between two of the plurality of protrusions 134 (FIG. 1) of stop 130. When the riser 120 has been turned such that the flanges 204, 206, 208, 210 enter the grooves between the protrusions, further vertical movement of the riser along axis 103 is substantially prevented. By substantially prevented, it is meant that movement along axis 103 is prevented except for some movement to the extent caused by the differential in the relative sizes of the at least one flange and the at least one groove in which it resides, including variations in their respective manufacturing tolerances.

When the riser is rotated in a second direction, for example in the clockwise direction, the flanges 204, 206, can be moved out of the grooves 128, 135 defined by the protrusions 126, 134, of the stops 124, 130, respectively, to permit relative telescoping movement along axis 103 between the riser 120 and the inner shaft 122. As mentioned above, the riser 120 includes at least one flange but in alternative embodiments includes at least two or more flanges, for example, 204, 206, 208, 210, which concurrently engage adjacent grooves associated with each adjacent stop. Also, it should be understood that the turning motions could be reversed to adjust the height of riser 120. For example, if the grooves 128, 135, formed by protrusions 126, 134, are open to the right of stops 124, 130, rather than the left of stops 124, 130, as shown in FIG. 3, then the riser 120 would be turned in a clockwise position to slide the flanges 204, 206, of riser 120 into the grooves, and the riser 120 would be turned in the counterclockwise direction to move the flanges 204, 206 out of the grooves. Therefore, a desired water level in the tank can be precisely selected by moving the riser 120, and correspondingly the float 112, up or down within the tank. The selected height adjustment can be further held in place by a lock 220.

In one example embodiment the lock 220 is in physical communication with the riser. The lock 220 may be physically connected to the riser 120 by a separate structure, and in an alternative embodiment, it may be integral with the riser 120. In this respect, the term "integral" refers to the fact that the lock 220 and the riser 120 comprise a single structure. Therefore the lock 220 may be included with the riser 120 as a portion of the toilet fill valve 100 in a single piece construction. More specifically, the lock 220 may be molded as a portion of the riser 120, however in alternative example embodiments, it may be snapped or clamped or connected to the riser 120 or to the toilet fill valve 100 in some other manner.

In one embodiment the body 222 of the lock 220 can have a shape that conforms to the shape of the riser 120, for example a curvature shape as shown in FIGS. 1-3. The body 222 of the lock 220 can also include a release lever 226 and a contact surface 224. The contact surface is capable of being placed in butting contact and out of contact with inner shaft 122, and for example, the stop 124 of the inner shaft 122, as shown by the exertion of a force on the release lever 224.

Figure 4:
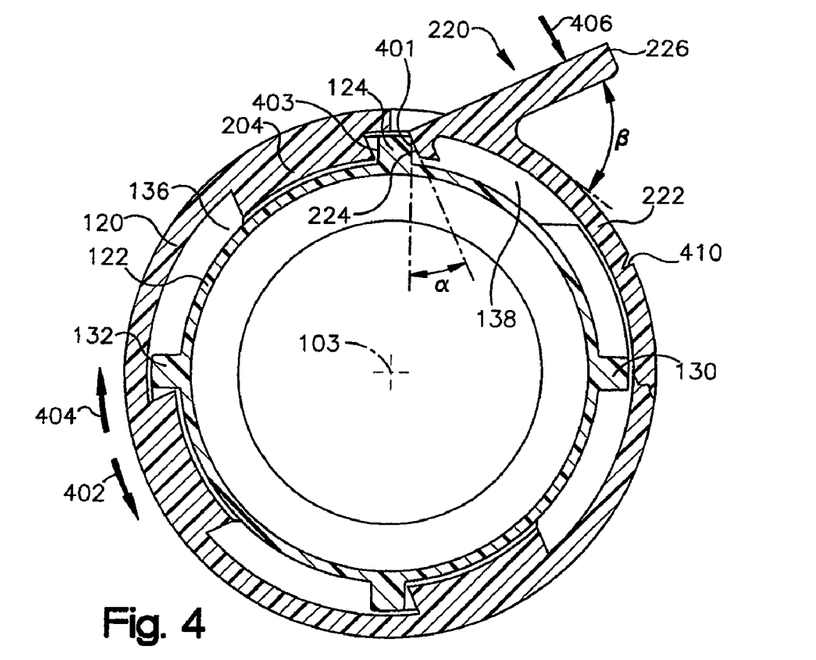
FIG. 4 is a cross sectional view taken along lines 4-4 of FIG. 1 showing the lock in the locked position, according to an embodiment of the invention.
Figure 5:
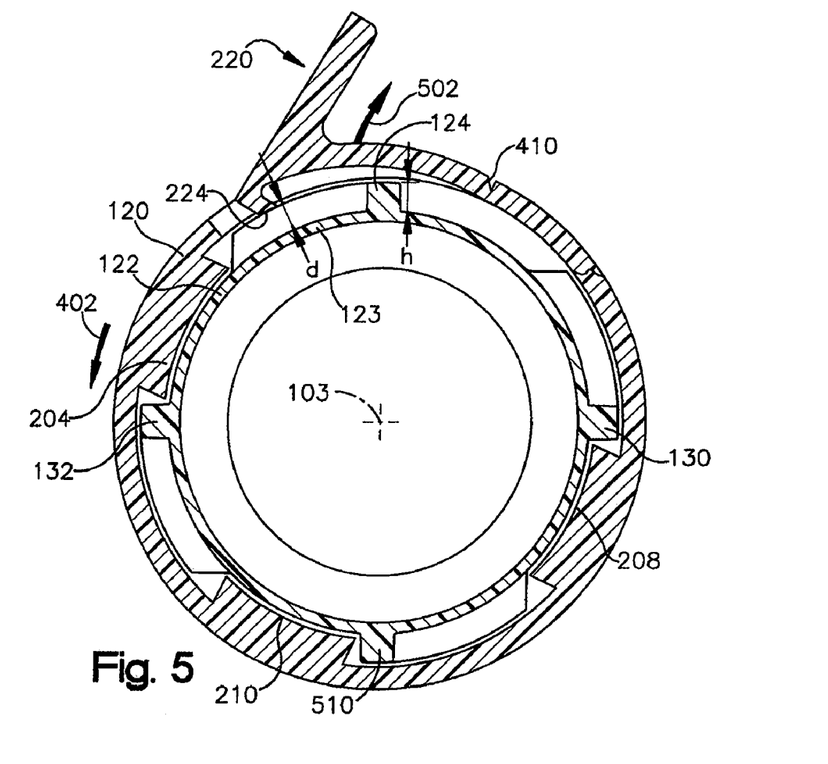
FIG. 5 is a cross sectional view of the riser and inner shaft of FIG. 4 showing the lock in the unlocked position, according to an embodiment of the present invention.

FIGS. 4 and 5 show the manner in which the lock 220 which can move toward and away from axis 103 can be utilized to permit and also limit rotation of the riser 120 relative to the inner shaft 122. FIG. 4 is a cross-sectional view of the toilet fill valve 100 taken along lines 4-4 of FIG. 1 showing lock 220 in the locked position. As shown in the example embodiment of FIG. 4, the contact surface 224 of lock 220 contacts a lock contacting surface 401 of stop 210 of the inner shaft 122 thereby limiting movement, and eventually preventing movement, of the riser 120 in a direction as indicated by arrow 402. On another surface, a flange contacting surface 403 of stop 124, the flange 204 of the riser 220 interferes with the stop 124 of the inner shaft 122 thereby limiting movement and eventually preventing movement of the riser 120 in the direction as indicated by arrow 404.

It should be understood, however, that it is not necessary that contact surface 224 of lock 220 contact a stop, for example stop 124, when the lock is in the locked position. For example, the lock 220 can be positioned such that there is a gap between contact surface 224 of lock 220 and stop 124, so long as the distance, for example the circumferential distance, between the lock 220 and the stop 124 is less than the length of the groove, for example groove 128 (FIGS. 1, 3). In other words, when the flange 204 contacts surface 403 of stop 124, the gap between stop 124 and lock 220 is a distance that is less than the circumferential distance that the protrusions 126 (FIGS. 1, 3) extend circumferentially along body 123 (FIG. 1) of inner shaft 122 to form the grooves 128. This can ensure that any relative circumferential movement between the riser 120 and the inner shaft 122 does not cause the flange, for example flange 204, to be moved out of the groove 128 and into channel 136 to allow telescoping movement of the riser 120 relative to the inner shaft 122 along the axis 103.

The contact surface 224 of lock 220 as shown in FIG. 4 is oriented at an angle alpha, $\alpha$, that can range up to about 180 degrees, and in some embodiments up to about 90 degrees, relative to stop 124. In an alternative embodiment, the contact surface 224 of lock 220 is substantially in contact with stop 124, such as for example, where the first surface 401 of stop 124 and contact surface 224 of lock 220 are substantially parallel to one another.

In one embodiment lock 220 may include hinge 410 and hinge 410 can be in physical communication with riser 120 in both the locked position (FIG. 4) and the unlocked position (FIG. 5). Hinge 410 allows lock 220 to swing toward and away from axis 103 in a locked and an unlocked position. Lock 220 in FIGS. 4 and 5 is shown having a living hinge that can be, for example, a thin, flexible web of material that joins two rigid bodies together, for example, the body of the lock 220 and the riser 120. As shown in the example embodiment of FIG. 4, hinge 410 is v-shaped as a "v" wedge. The v-shape allows for a spring force, although alternative hinges and shapes of hinges can be used to allow movement of the lock 220 toward and away from axis 103 such as a "u" shaped hinge. Also, for example, hinge 410 can have two opposing v-shaped wedges separated by a thin piece of material. In another alternative, no hinge may be employed at all, where the material from which the lock 220 is flexible enough to allow enough travel of the lock 220 so that riser 120 may be moved from the locked position to the unlocked position and vice versa.

Lock 220 and hinge 410, can be made of one of many polymers, for example, thermoset and thermoplastic polymers, including but not limited to, thermoplastic polymers, such as for example, polypropylene, polyethylene, polyester, nylon, and acetal. Although hinge 410, which is shown for example as a living hinge, can be designed to withstand thousands of flexes, the riser 120 of the toilet fill valve 100 typically may only require adjustment a few times during the course of its life.

In another embodiment, the release lever 226 of lock 220 can be oriented, relative to a tangential surface of body 222 of lock 220, at an angle beta, $\beta$, that can range up to about 90 degrees, and in an alternative embodiment, up to about 45 degrees. The angled orientation between the release lever 226 and body 222 of lock 220 provides leverage for movement of lock 220 away from axis 103 when a force represented by arrow 406 is applied to release the stop 124 of inner shaft 122. When force 406 is applied to release lever 226, for example in a direction toward the tangential surface of body 222, hinge 410 of lock 220 is compressed and contact surface 224 is released from the stop 124. The v-shape of hinge 410, combined with the material characteristics of hinge 410, can provide a spring force that allows body 222 of lock 220, for example, to remain in line with, or conform to the geometric profile of riser 120 when lock 220 is in the locked position. In another embodiment, the spring force may cause body 222 of lock 220 to remain in the unlocked position unless held down by stop 124 when in the locked position.

FIG. 5 shows lock 220 in the unlocked position. Lock 220 is shown moved in an outward direction, indicated by arrow 502, away from axis 103 and the contact surface 224 of lock 220 has been moved a distance, d, that is at least as great as the height, h, of stop 124 in an unlocked position. When the lock 220 is in the unlocked position the riser 120 is free to rotate in the direction as indicated by arrow 402. The flange of the riser 120, for example flange 204 can be moved out of the groove defined by protrusion 128, and into channel 136, and additional flanges, if present, can be moved out of the grooves and into channels, such that the riser is free to move along axis 103. The height of the riser 120 can be readjusted such that the flanges are inserted into different grooves and the riser 120 can be turned in the direction indicated by arrow 404 (FIG. 4) and lock 220 can be sprung back into the lock position as shown in FIG. 4, for example, where the contact surface 224 of lock 220 abuts stop 124 of inner shaft 122.

In the locking arrangement of FIGS. 4 and 5, as just described it is seen that the engagement of contact surface 224 with lock contacting surface 401 of step 210 is such that, when disengagement takes place by means of the force shown by arrow 406, the contact surface 224 rotates toward surface 401, and, especially if surface 224 is flat and parallel to surface 401, at least a portion of surface 224 bears against surface 401 throughout the disengagement. For this reason, surface 224 is inclined at angle x so that application of force 406 causes disengagement as soon as the contact point of surface 224 disengages from surface 401. The engagement of surface 224 is, as but seen in FIG. 4, is at a point.

Figure 6:
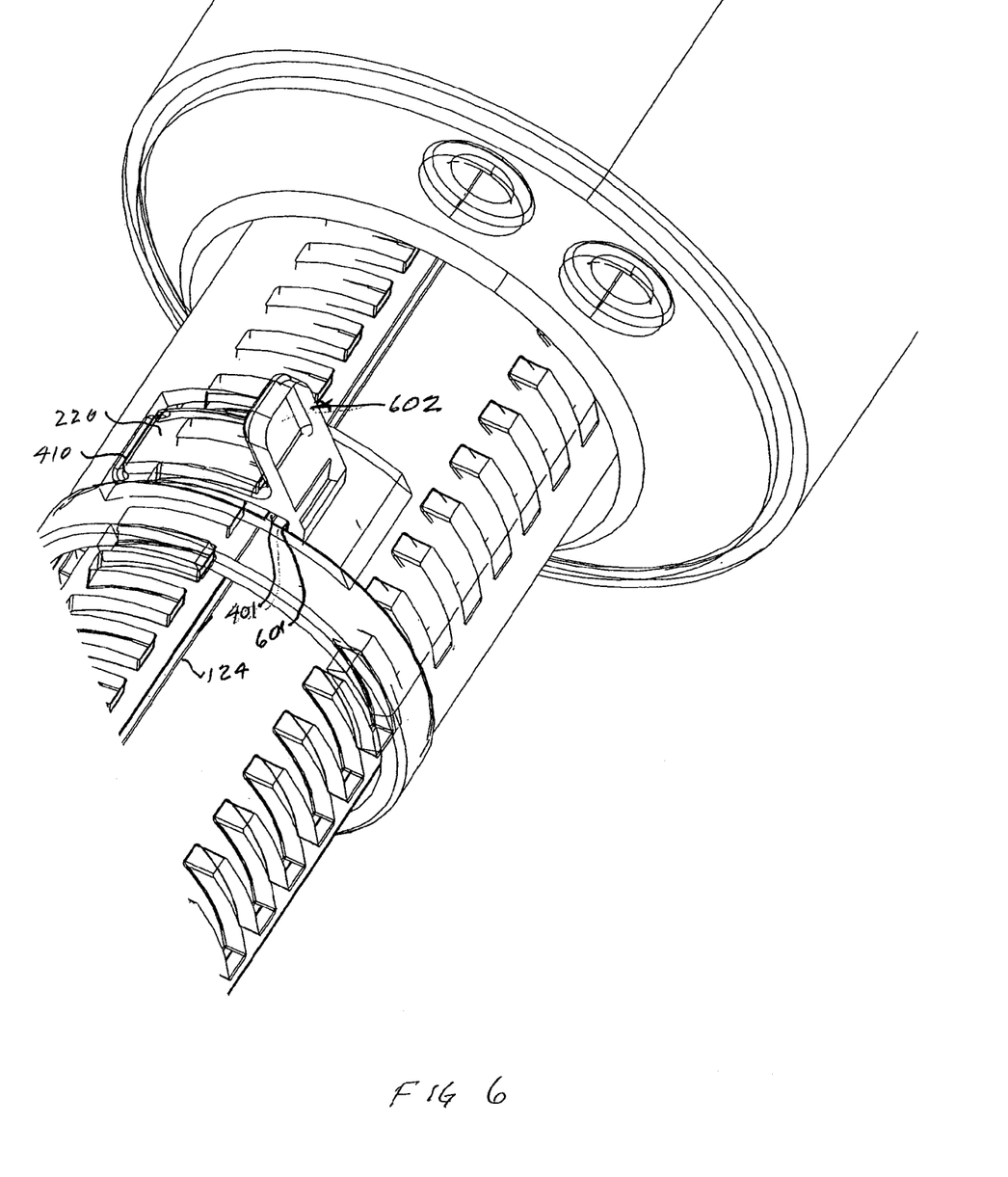
FIG. 6 is a perspective line drawing of another embodiment of the present invention.

In FIG. 6 there is depicted an embodiment of the invention wherein, as will be explained, the contacting surface 601 of lock 220 is parallel to the lock contacting surface 401 and bears there against in the locking position, which forms a more positive locking surface. This is made possible by lock 220 being reversed in position relative to the lock position of FIG. 4. Thus, when disengagement is desired, application of a force as shown by the arrow 602 causes contacting surface 601 to rotate away from the contacting surface, as shown by the arrow 603 in FIG. 7, producing immediate disengagement, and therefore obviating the necessity of producing an angle on contacting surface 601.

Figure 7:
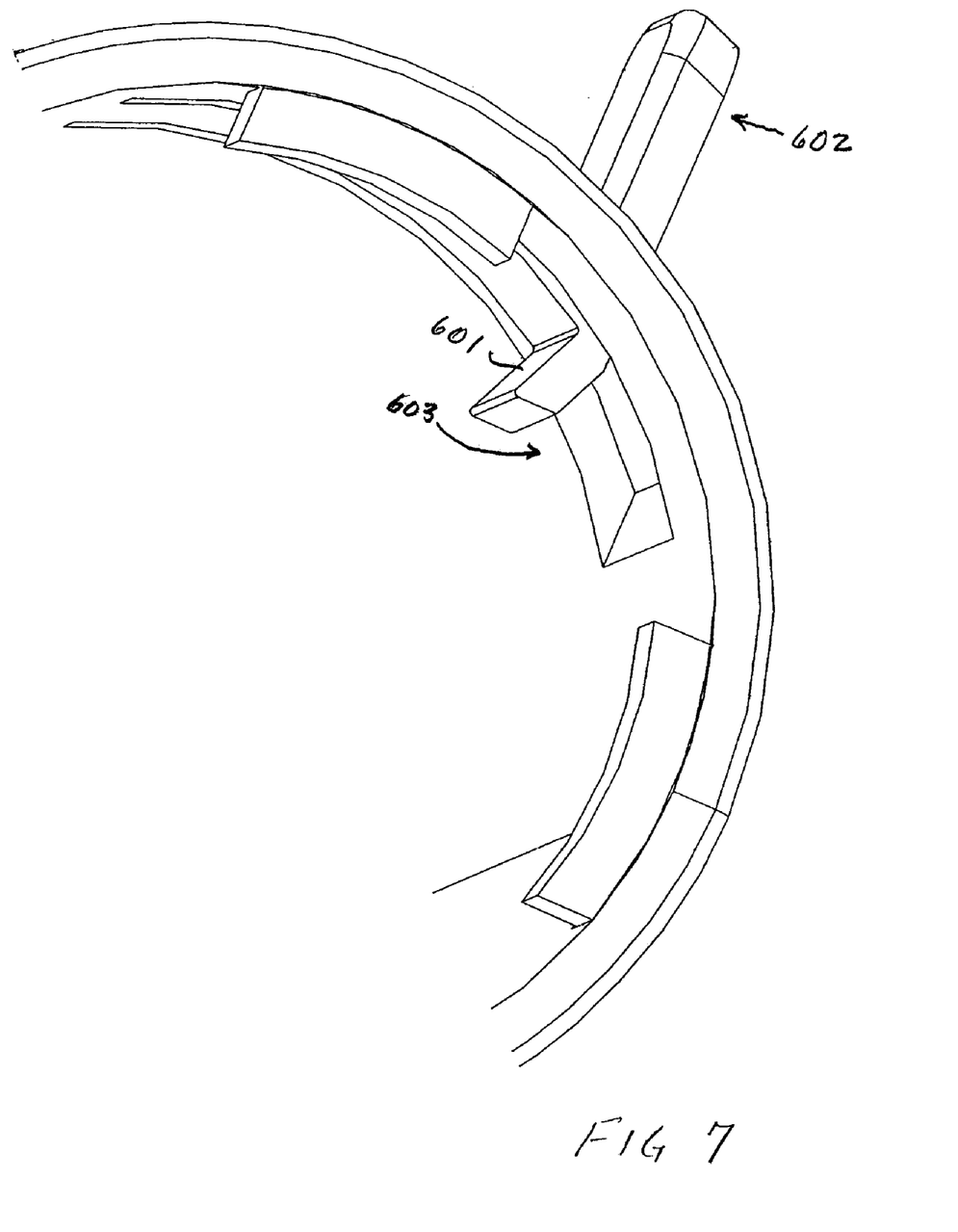
FIG. 7 is a perspective diagrammatic view of the lock of the embodiment of FIG. 6.

It can be seen that the circumferential orientation of the lock 220 in FIGS. 6 and 7 is opposite that of the orientation of the lock 220 in FIGS. 4 and 5. Thus, as shown in FIGS. 4 and 5, the surface 224 of lock 220 is spaced from the hinge 410 and butts against the lock contacting surface 401 of the stop 124, whereas the lock 220 of the embodiment of FIGS. 6 and 7 extends from the hinge 410 to the lock contacting surface

401 by overlapping the stop 124 so that the contacting surface 601 bears against the surface 401. Also, in the arrangement of FIGS. 4 and 5, the disengaging force (arrow 406) is in the direction away from stop 124 whereas in the embodiment of FIGS. 6 and 7, it is toward stop 124, thereby producing immediate disengagement.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

Therefore, having thus described the invention, at least the following is claimed:

1. A toilet fill valve comprising:
   a riser;
   an inner shaft disposed in the riser, wherein the riser is telescopically adjustable relative to the inner shaft;
   a stop protrusion extending longitudinally along the inner shaft;
   a plurality of grooves formed along the inner shaft by a plurality of extensions extending from the stop protrusion;
   at least one flange integrally molded in the riser, the at least one flange protruding inward toward the inner shaft, the at least one flange being compatible with each of the grooves; and
   a lock having a moveable contact that abuts against the stop protrusion in a locked state and that rests against at least one of the extensions in an unlocked state, wherein the lock comprises a hinge.

2. The toilet fill valve of claim 1, wherein the hinge pivots away from the inner shaft.

3. The toilet fill valve of claim 1, wherein the lock comprises the hinge at a proximal end of the lock and the moveable contact is at a distal end of the lock.

4. A toilet fill valve comprising:
   a riser;
   an inner shaft disposed in the riser, wherein the riser is telescopically adjustable relative to the inner shaft;
   a stop protrusion extending longitudinally along the inner shaft;
   a plurality of grooves formed along the inner shaft by a plurality of extensions extending from the stop protrusion;
   at least one flange integrally molded in the riser, the at least one flange protruding inward toward the inner shaft, the at least one flange being compatible with each of the grooves; and
   a lock having a moveable contact that abuts against the stop protrusion in a locked state and that rests against at least one of the extensions in an unlocked state, wherein the lock is connected to the riser via a hinge.

5. The toilet fill valve of claim 4, wherein the lock is connected to the riser via a living hinge.

6. A toilet fill valve comprising:
   a riser;
   an inner shaft disposed in the riser, wherein the riser is telescopically adjustable relative to the inner shaft;
   a stop protrusion extending longitudinally along the inner shaft;
   a plurality of grooves formed along the inner shaft by a plurality of extensions extending from the stop protrusion;
   at least one flange integrally molded in the riser, the at least one flange protruding inward toward the inner shaft, the at least one flange being compatible with each of the grooves; and
   a lock having a moveable contact that abuts against the stop protrusion in a locked state and that rests against at least one of the extensions in an unlocked state, wherein the moveable contact that abuts against a side of the stop protrusion opposite the extensions when in a locked state.

7. A toilet fill valve comprising:
   a riser;
   an inner shaft disposed in the riser, wherein the riser is telescopically adjustable relative to the inner shaft;
   a stop protrusion extending longitudinally along the inner shaft;
   a plurality of grooves formed along the inner shaft by a plurality of extensions extending from the stop protrusion;
   at least one flange integrally molded in the riser, the at least one flange protruding inward toward the inner shaft, the at least one flange being compatible with each of the grooves; and
   a lock having a moveable contact that abuts against the stop protrusion in a locked state and that rests against at least one of the extensions in an unlocked state, wherein the lock includes a release lever, and wherein movement of the release lever away from the stop protrusion causes the contact of the lock to disengage from the stop wherein the movement of the release lever away is away from the inner shaft.

* * * * *